(12) United States Patent
Vliet et al.

(10) Patent No.: US 9,617,734 B2
(45) Date of Patent: Apr. 11, 2017

(54) GLASS MAT FOR ROOFING PRODUCTS

(71) Applicant: SAINT-GOBAIN ADFORS CANADA, LTD., Grand Island, NY (US)

(72) Inventors: Wayne R. Vliet, Mount Pleasant, SC (US); Missy R. Miller, Tuscumbia, AL (US); Ronald L. Franklin, Jr., Mount Pleasant, SC (US); Charles G. Herbert, Shrewsbury, MA (US); Nancy E. Brown, New Braintree, MA (US); Fei Wang, Stoneham, MA (US)

(73) Assignee: SAINT-GOBAIN ADFORS CANADA, LTD., Grand Island, NY (US)

( * ) Notice: Subject to any disclaimer, the term of this patent is extended or adjusted under 35 U.S.C. 154(b) by 386 days.

(21) Appl. No.: 14/150,496

(22) Filed: Jan. 8, 2014

(65) Prior Publication Data

US 2014/0194020 A1    Jul. 10, 2014

Related U.S. Application Data

(60) Provisional application No. 61/750,045, filed on Jan. 8, 2013.

(51) Int. Cl.
*E04D 5/02* (2006.01)
*D06N 3/00* (2006.01)
(Continued)

(52) U.S. Cl.
CPC .............. *E04D 5/02* (2013.01); *D04H 1/4218* (2013.01); *D04H 1/64* (2013.01); *D06N 3/0011* (2013.01);
(Continued)

(58) Field of Classification Search
CPC  C11D 7/5018; C11D 7/5063; C23G 5/02806; D04H 1/4218; D04H 1/64;
(Continued)

(56) References Cited

U.S. PATENT DOCUMENTS 5,300,562 A   4/1994  Coventry et al.
5,312,483 A   5/1994  Sawatzky et al.
(Continued)

FOREIGN PATENT DOCUMENTS

CN       1173524 A    2/1998
CN     101514279 A    8/2009
(Continued)

OTHER PUBLICATIONS

International Search Report for PCT/US2014/010709 dated Apr. 30, 2014, 4 pgs.
(Continued)

*Primary Examiner* — Arti Singh-Pandey
(74) *Attorney, Agent, or Firm* — Abel Law Group, LLP; Robert N Young (57) ABSTRACT

A glass mat includes an assembly of glass fibers, a binder composition and an asphaltic coating. The binder composition includes an organic resin and an adhesion promoter. The glass mat has an at least 2% increase in tear strength as measured using the methods specified in ASTM D3462, compared to an asphaltic coated glass mat having a binder composition without the adhesion promoter. Further provided is an asphalt roofing product including the glass mat and a method of increasing tear strength in an asphalt roofing product.

19 Claims, 1 Drawing Sheet (51) Int. Cl.
  *D06N 5/00* (2006.01)
  *D04H 1/4218* (2012.01)
  *D04H 1/64* (2012.01)
(52) U.S. Cl.
  CPC ........... *D06N 3/0022* (2013.01); *D06N 5/003* (2013.01); *Y10T 428/249921* (2015.04); *Y10T 442/2992* (2015.04)
(58) Field of Classification Search
  CPC .... D06N 3/0011; D06N 3/0022; D06N 5/003; E04D 5/02; Y10T 428/249921; Y10T 442/2992
  See application file for complete search history.

(56) References Cited

U.S. PATENT DOCUMENTS

| | | |
|---|---|---|
| 6,993,876 B1 | 2/2006 | Peng et al. |
| 2004/0014385 A1 | 1/2004 | Greaves, Jr. et al. |
| 2006/0228962 A1 | 10/2006 | Souther et al. |
| 2006/0228963 A1* | 10/2006 | Souther .................. B32B 5/022 442/86 |
| 2006/0292952 A1 | 12/2006 | Xing et al. |
| 2008/0038977 A1 | 2/2008 | Lebduska et al. |
| 2008/0214716 A1* | 9/2008 | Weiss .................... C09J 133/14 524/424 |
| 2009/0311936 A1 | 12/2009 | Espiard et al. |
| 2010/0197185 A1* | 8/2010 | Herbert ................. D04H 1/641 442/327 |
| 2011/0190425 A1 | 8/2011 | Swift |
| 2012/0064295 A1 | 3/2012 | Klett et al. |

FOREIGN PATENT DOCUMENTS

| | | |
|---|---|---|
| EP | 1283239 A1 | 2/2003 |
| EP | 2053083 A1 | 4/2009 |
| GB | 1274326 A | 5/1972 |
| WO | 2011-159287 A1 | 12/2011 |
| WO | 2011159287 A1 | 12/2011 |
| WO | 2014110151 A1 | 7/2014 |

OTHER PUBLICATIONS

Supplemental European Search Report from EP14737708 dated Sep. 5, 2016, 1pg.

* cited by examiner

GLASS MAT FOR ROOFING PRODUCTS

CROSS-REFERENCE TO RELATED APPLICATION

The present application claims priority from U.S. Provisional Patent Application No. 61/750,045, filed Jan. 8, 2013, entitled "GLASS MAT FOR ROOFING PRODUCTS," naming inventors Wayne R. Vliet, Missy R. Miller, Ronald Leon Franklin, Jr., Charles G. Herbert, Nancy E. Brown, and Fei Wang, which application is incorporated by reference herein in its entirety.

FIELD OF THE DISCLOSURE

The present disclosure relates to a glass mat and in particular, a glass mat for asphalt roofing products.

BACKGROUND

Roofing materials, such as shingles, roll roofing, and commercial roofing, are typically constructed of a glass fiber mat with an asphalt coating on the fibrous mat, and a surface layer of granules embedded in the asphalt coating.

Chopped strand mat, suitable for use in roofing material, generally includes glass fibers because they are of high strength and tend not to shrink during use. The glass fibers are typically formed by attenuating streams of molten glass material from a bushing. The fibers are drawn from the bushing and the fibers are then chopped directly into a container. The chopped fibers are then dispersed in a water slurry which contains surfactants, viscosity modifiers, dispersants and other chemical agents. The fibers and slurry are agitated to disperse the fibers prior to depositing the mixture onto a moving screen where most of the water is removed. Although this generally describes a wet-laid process, a dry-laid process may be used.

A polymeric binder is then applied. A urea-formaldehyde ("UF") binder is typically utilized for asphalt roofing product applications due to its low cost, compatibility with asphalt and resulting high strength. After application of the polymeric binder, the resulting mat is heated to remove the remaining water and cure the binder. Next, an asphalt coating that typically includes a mixture of oxidized asphalt, mineral stabilizer and possibly polymer additives is applied to the mat, such as by spraying the asphalt onto one or both sides of the mat, or by passing the mat through a bath of molten asphalt in order to place a layer of asphalt on both sides of the mat. A protective coating of granules may be applied to the asphalt-coated mat to provide a roofing material, such as a shingle.

Important properties for a glass mat include dry tensile strength, hot asphalt tensile strength, hot wet tensile strength, and tear strength. These mechanical properties are useful in determining the asphalt roofing product manufacturing and ultimate reinforcing properties in the shingle. Modifications to the glass mats and the binder compositions to improve such properties are desired.

Accordingly, a need continues to exist in the art for binder compositions for glass mats that can meet new and sometimes exceed demanding applications.

SUMMARY

In an embodiment, a glass mat includes an assembly of glass fibers; a binder composition including an organic resin and an adhesion promoter including a resin acid additive, a tall oil fatty acid, a rosin, a tall oil derivative, or combination thereof; and an asphaltic coating; wherein the glass mat has an at least 2% increase in tear strength as measured using the methods specified in ASTM D3462, compared to an asphaltic coated glass mat having a binder composition without the adhesion promoter.

In another embodiment, an asphalt roofing product is provided. The roofing product includes a glass mat including an assembly of glass fibers; a binder composition including an organic resin and an adhesion promoter including a resin acid additive, a tall oil fatty acid, a rosin, a tall oil derivative, or combination thereof; and an asphaltic coating; wherein the glass mat has an at least 2% increase in tear strength as measured using the methods specified in ASTM D3462, compared to an asphaltic coated glass mat having a binder composition without the adhesion promoter.

In yet another embodiment, a method of increasing tear strength in an asphalt roofing product is provided. The method includes providing a glass mat for the asphalt roofing product, wherein the glass mat includes an assembly of glass fibers; a binder composition including an organic resin and an adhesion promoter including a resin acid additive, a tall oil fatty acid, a rosin, a tall oil derivative, or combination thereof; and an asphaltic coating; wherein the glass mat has an at least 2% increase in tear strength as measured using the methods specified in ASTM D3462, compared to an asphaltic coated glass mat having a binder composition without the adhesion promoter.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. The term "tear strength" is intended to include the cross direction strength of a glass mat including a binder composition and an asphalt coating as measured by ASTM D3462. The term "ASTM D3462" is intended to refer to the American Society for Testing and Materials (ASTM) Standard D-3462 Standard Specification for Asphalt Shingles Made from Glass Felt and Surfaced with Mineral Granules, which sets the minimum standard for residential fiberglass roofing shingles. The term "filament" is intended to mean an elongated structure or fiber of any suitable length. The term "mat" is intended to mean a woven or nonwoven fabric that includes any suitable arrangement of filaments other than an arrangement of filaments in a scrim, including an arrangement of randomly oriented filaments.

As used herein, the terms "comprises", "comprising", "includes", "including", "has", "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

In an embodiment, the present invention provides a glass mat. The glass mat includes an assembly of glass fibers; a binder composition including an organic resin and an adhesion promoter, such as a resin acid additive, a tall oil fatty acid, a rosin, a tall oil derivative, or combination thereof. Further included on the assembly of the glass fibers is an asphaltic coating. The addition of the adhesion promoter to the binder composition of the glass mat provides an at least 2% increase in tear strength as measured using the methods specified in ASTM D3462, compared to an asphaltic coated glass mat having a binder composition without the adhesion promoter. The glass mat is particularly useful in roofing applications, such as for an asphalt roofing product. The glass mat for asphalt roofing product applications having the binder composition and asphaltic coating as described has improved tear strength, as compared to commercially available roofing shingles having a binder without the adhesion promoter, and can better provide desirable properties for asphaltic roofing products. A method of increasing the tear in an asphalt roofing product is further provided.

The binder composition includes any suitable organic resin. The organic resin can include one or more suitable polymers, one or more suitable copolymers, a suitable blend, or combination thereof. In an embodiment, the organic resin includes materials designed to withstand hot asphalt coating during the asphalt roofing product making process. In a particular embodiment, the organic resin is a thermosetting resin. For instance, the thermosetting resin is a urea-formaldehyde resin. The thermosetting urea-formaldehyde (UF) resin used as the major component of the binder composition of the present invention can be prepared from urea and formaldehyde monomers or from UF precondensates in any suitable manner. Any suitable form of the urea and the formaldehyde reactants is envisioned. In an embodiment, any form of the urea and the formaldehyde reactants which can react and which do not introduce extraneous moieties deleterious to the desired reaction and reaction product can be used in the preparation of urea-formaldehyde resins useful in the invention.

Formaldehyde for making a suitable UF resin is available in many forms. Paraform (solid, polymerized formaldehyde) and a formalin solution (an aqueous solution of formaldehyde, sometimes with methanol, for example, with any suitable concentration of formaldehyde, such as greater than about 35% by weight, such as about 37% by weight, about 44% by weight, or about 50% by weight formaldehyde concentrations) are commonly used forms. Formaldehyde also is available as a gas. Any of these forms is suitable for use in preparing a urea-formaldehyde resin in the practice of the invention. In a particular embodiment, the formalin solution is the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. In a particular embodiment, both urea prill and combined urea-formaldehyde products are used, such as Urea-Formaldehyde Concentrate or UFC 85.

Any of the wide variety of procedures used for reacting the principal urea and formaldehyde components to form the urea-formaldehyde thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to about 4:1, such as at a formaldehyde to urea mole ratio of about 2.1:1 to about 3.2: 1. Generally, the urea-formaldehyde resin is highly water dilutable, if not water soluble.

The reactants for making the urea-formaldehyde resin may also include an amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into urea-formaldehyde resins used in the invention. Concentrations of these modifiers in the reaction mixture often will vary from 0.05% to 20.0% by weight of the urea-formaldehyde resin solids. These types of modifiers may be used to promote hydrolysis resistance, polymer flexibility and lower formaldehyde emissions in the cured resin. Further urea additions for purposes of scavenging formaldehyde or as a diluent also may be used.

In an exemplary embodiment, the urea-formaldehyde composition is further modified with a cross-linking component. Any suitable cross-linking component is envisioned. Exemplary cross-linking components include, but are not limited to, a styrene maleic anhydride copolymer, a styrene acrylic, an organosilane such as aminoethylaminopropyltrimethoxysilane, aminopropyltriethoxysilane, vinyl benzyl silane, and the like, an epoxy, a polyaziridine, an isocyanate, a zinc salt, a zirconium salt, an N-methylol acrylamide, an isobutoxymethylacrylamide, an acrylamidoglycolic acid monohydrate, an N-(2,2'-hydroxy-1-dimethoxyethyl)acrylamide, a blocked isocyanate, an acetoacetoxyethyl methacrylate (AAEM), a TACT triazine, a titanate salt, sodium borate (Borax), the like, or a combination thereof.

In an embodiment, the urea-formaldehyde composition is modified with a styrene-maleic anhydride (SMA) copolymer. Such styrene-maleic anhydride (SMA) copolymers include alternating styrene and maleic anhydride monomer units, arranged in random, alternating or block form. Modified styrene-maleic anhydride copolymers, such as copolymers that are partially esterified or copolymers containing sulfonate groups on the benzene ring, also can be used according to the present invention. Suitable styrene-maleic anhydride copolymers for practicing the present invention may typically have a weight average molecular weight from about 1,000 to about 500,000. Such styrene-maleic anhydride (SMA) copolymers are unneutralized, and are initially insoluble in water. However, after a sufficient extent of neutralization using any suitable alkaline substance, such as a hydroxide, like sodium hydroxide, potassium hydroxide, ammonium hydroxide, lithium hydroxide, or cesium hydroxide; a carbonate, like sodium carbonate, potassium carbonate or ammonium carbonate; ammonia or an amine, the styrene-maleic anhydride copolymers become neutralized to provide solubility in water. In an embodiment, a strongly basic alkali metal compound can be used for neutralizing the SMA copolymer, such as ammonium hydroxide, potassium hydroxide, sodium hydroxide, lithium hydroxide, cesium hydroxide, ammonium carbonate, potassium carbonate, sodium carbonate, or a combination thereof. Although it generally is desirable to use the neutralizing agent in an amount sufficient to neutralize 100 mole % of the SMA copolymer, in an embodiment it is suitable to neutralize the SMA copolymer at less than 100 mole %, such as at a neutralization sufficient to obtain water solubility of the SMA copolymer. The level of addition of any particular neutralizing agent to obtain an acceptable degree of water solubility is well within the normal skill in the art. Typically, the styrene-maleic anhydride copolymer is provided to the binder composition of this invention as a water-soluble styrene-maleic anhydride copolymer.

Suitable styrene-maleic anhydride copolymers for use in accordance with the method of the present invention are commercially available from, for example, ARCO Chemical Co., Elf Atochem, Georgia Pacific Resins, Inc. and others. Suitable binders can be prepared by mixing the urea-formaldehyde and the styrene-maleic anhydride copolymer, on a solids basis, in a UF:SMA weight ratio between about 99.9:0.1 to about 70:30, such as between about 99.8:0.2 to about 90:10, or even between about 99.8:0.2 to about 95:5. In an embodiment, any suitable amount of a cross-linking component may be envisioned.

Many urea-formaldehyde resins which may be used in the practice of the invention are commercially available. In an embodiment, the urea-formaldehyde resin typically has a desirable viscosity for application as a binder composition on the glass mat. For instance, the viscosity of the urea-formaldehyde resin is about 50 centipoise (cps) to about 500 cps, such as about 150 cps to about 300 cps. Further, the urea-formaldehyde has a desirable pH for application to the assembly of fibers, such as a pH of about 7.0 to about 9.0, or even a pH of about 7.5 to about 8.5. Urea-formaldehyde, such as the type sold by Georgia Pacific Corporation for glass mat application, and those sold by Momentive Chemical Company may be used.

In a particular embodiment, the binder composition includes an adhesion promoter such as a resin acid additive, a fatty acid additive, a rosin, a tall oil derivative, or combination thereof, which are typically components of or are derived from components of a tall oil. Typically, the adhesion promoter includes the resin acid additive, the tall oil fatty acid, the rosin, the tall oil derivative, or combination thereof present to provide enhanced compatibility of the binder composition to the components of the mat, such as the assembly of fibers and the asphaltic coating. Any suitable tall oil based additive is envisioned. Any suitable resin acid additive is envisioned. For example, resin acids are diterpene monocarboxylic acids, generally isomers of general formula $C_{20}H_{30}O_2$. Their name "resin" comes from the fact that they are synthesized by plants, in particular resinous plants. Any tall oil fatty acid additive is envisioned. Typically, tall oil fatty acid is another component of tall oils that are mixtures of long chain oligomers consisting mainly of oleic and linoleic acids and other similar compounds. Many of these compounds contain double bond functionality that can dimerize or trimerize during the separation process from the crude tall oil mixture. Any tall oil derivative is envisioned that is derived from the tall oil purification process. Useful tall oil derivatives such as rosin soaps, purified dimer and trimer fatty acids as well as esterified rosin ester gums, and maleic anhydride modified rosins also provide enhanced compatibility to asphalt.

Resin acids are divided into several categories depending on their basic chemical structure. Thus, structures of the following types are distinguished: abietane, pimarane/isopimarane which have three rings containing six carbons connected along one side, or else labdane. The resin acids have a carboxylic acid functionality and at least one double bond, generally two or three double bonds, including two conjugating double bonds for acids of abietane structure. The most common resin acids are for the group of abietanes: abietic acid (CAS No. 514-10-3), neoabietic acid (CAS No. 471-77-2), palustric acid (CAS No. 1945-53-5), levopimaric acid (CAS No. 79-54-9) and dehydroabietic acid (CAS No. 1740-19-8); and for the group of pimaranes: pimaric acid (CAS No. 127-27-5), isopimaric acid (CAS No. 5835-26-7) and sandaracopimaric acid (CAS No. 471-74-9). Tall oil fatty acids are generally composed of palmitic and shorter carbon chain fatty acids, oleic acid, linoleic, conjugated linoleic and linolenic acid, stearic acid, and eicosatrienoic eicosadienoic acids.

In an embodiment, the resin acid and the fatty acid may be obtained directly from pine oleoresin. Typically, resin acids are the main non-volatile component of pine resin. Typically, fatty acids are the main volatile component of pine resin. After evaporation by distillation of certain volatile elements (such as terpenes, for example, α-pinene), the solidified resin or rosin is composed of about 90% by weight of resin acids, predominantly abietic acid (such as about 40% to about 50%), based on the total % weight of the resin acid.

Resin acids and fatty acids may be obtained as by-products of the "Kraft" process of paper manufacture. They are then part, with fatty acids, of what is commonly known as tall oil or pine oil. Various distillations make it possible to obtain a tall oil that is more or less purified and therefore more or less rich in resin acids. The rosin used may be produced either from tall oil ("pine oil rosin"), or directly from pine resin ("pine turpentine rosin"), or else from aged pine stumps ("wood rosin"). In an embodiment, the rosin is obtained from tall oil and then typically includes a larger proportion of pimarane-type acids compared to the abietic and other rosin acid components. In a particular embodiment, the tall oil based additive is distilled tall oil that includes fatty acids, such as, for example, those mainly of the oleic type.

Other exemplary adhesion promoters for the glass mat include, but are not limited to, lethicin, an asphalt compatible wax such as Clamant Licomont BS 100, a chlorinated olefin wax (such as Airflex CEN203 Emulsion), a polyethylene acrylic acid emulsion (such as Michem Prime 4983-40F), a starch grafted styrene acrylic (Degree 40+, Solv.), an emulsified asphalt, a organosilane such as vinyl benzyl silane, a fatty acid alcohol, a fatty acid polyethylene oxide (PEO), a maleic anhydride modified butyl rubber, Shellac, a rosin, a rosin soap, a rosin gum, a maleic anhydride modified rosin, an animal glue, a vegetable oil, a tall oil dimer plus trimer acid, an epoxidized soybean oil, a CAPA triol, a wheat protein, a vegetable wax (Carnauba, sunflower, rice bran, and the like), a maleic anhydride modified polypropylene and polyethylene, a polyethylene acrylic acid, a polyethylene glycol-polyethylene copolymer, a polypropylene glycol -polyethylene copolymer, the like, or a combination thereof. In a particular embodiment, the adhesion promoter is in the form of a waterborne emulsion or dispersion.

In an embodiment, the adhesion promoter may be present at any suitable amount to enhance the adhesion of the binder composition to the glass mat to increase the bonding strength between the assembly of fibers. In a further embodiment, the adhesion promoter is present at an amount to increase the adhesion of the asphaltic coating to the glass mat and binder composition. For instance, the adhesion promoter is present at an amount of up to about 10.0% by weight, such as not greater than about 5.0% by weight, such as not greater than about 4.0% by weight, or even not greater than about 3.0% by weight, based on the total % by weight of the binder composition. In an embodiment, the adhesion promoter is present at an amount of about 1.0% by weight to about 5.0% by weight, based on the total weight % of the binder composition. In an exemplary embodiment, the resin acid additive, the tall oil fatty acid, the rosin, the tall oil derivative, or combination thereof is present at an amount of up to about 10.0% by weight, such as not greater than about 5.0% by weight, such as not greater than about 4.0% by weight, or even not greater than about 3.0% by weight, based on the total % by weight of the binder composition. In a particular embodiment, the resin acid additive, the tall oil fatty acid, the rosin, the tall oil derivative, or combination thereof is present at an amount of about 1.0% by weight to about 5.0% by weight, based on the total weight % of the binder composition.

The binder composition can also include any suitable additive. For instance, the binder composition may include an additional polymer component to increase tensile strength, such as an acrylic latex and more particularly, a cross-linking acrylic latex. In an embodiment, the acrylic latex is present at an amount of up to about 15.0% by weight, based on the total weight % of the binder composition. The binder composition may also contain a variety of other known additives such as a silica colloid to enhance fire resistance, antifoamers, biocides, pigments, the like, or combinations thereof. In an embodiment, the binder composition can include less than about 25% by weight of additives, based on the total weight of the binder composition. In another embodiment, the binder composition is substantially free of additives. "Substantially free" as used herein refers to less than about 1% by weight of additives, less than about 0.5% by weight of additives, or even less than about 0.1% by weight of additives, based on the total weight of the binder composition.

To prepare the binder composition, the organic resin and the adhesion promoter may be added to the assembly of fibers by any suitable means. The binder composition is used to fixedly bond the assembly of fibers. They may be added separately or in combination. In a particular embodiment, the organic resin and the adhesion promoter are mixed together in a desired proportion under ambient conditions. In an embodiment, the adhesion promoter that is not originally dispersed in water should be emulsified (or dispersed in the case of the waxes) before the adhesion promoter is added to the binder composition. As described the organic resin and adhesion promoter are added together in the binder composition. In an embodiment, any other sequence of adding the components of the binder composition is envisioned. For instance, the organic resin of the binder composition may be applied to the assembly of fibers and the adhesion promoter added in a subsequent step. For instance, the adhesion promoter they can be sprayed or gravity feed on top of the web before the organic resin of the binder composition is cured. In an alternative embodiment, the adhesion promoter can be applied after the organic resin of the binder composition is cured.

The total concentration of components in the binder composition in an aqueous solution can vary widely in accordance with the practice of the present invention, but it will usually be found convenient and satisfactory to make up this composition at total solids concentration in the range from about 5% by weight to about 40% by weight, such as about 20% by weight to about 30% by weight of the total aqueous binder composition. As used herein, the solids content of a composition is measured by the weight loss upon heating a small, for example, about 1gram to about 5 grams, sample of the composition at 105° C. for 3 hours.

The glass mat includes the binder composition on the assembly of fibers. The assembly of fibers can include a variety of suitable materials. For instance, the assembly of fibers can include a glass fiber, such as a fiber made from A-type glass fiber, a C-type glass fiber, an E-type glass fiber, an S-type glass fiber, an E-CR-type glass fiber, a wool glass fiber, or a combination thereof. Any suitable configuration of the assembly of fibers is envisioned. In an embodiment, the assembly of fibers may be in a non-woven mat. In a particular embodiment, the assembly of fibers can be any length such as continuous strand, chopped, or combination thereof. In a more particular embodiment, the assembly of fibers is chopped into suitable random lengths to provide randomly disposed fibers.

An exemplary method of forming a glass fiber mat in accordance with the present invention begins with an assembly of fibers, such as chopped bundles of glass fibers of suitable length. While reference is made using chopped bundles of glass fibers, other forms of glass fibers, such as continuous strands, may also be used. Generally, fibers having a length of about 0.75 inches to about 3 inches and a diameter of about 3 microns to about 20 microns are used. Each assembly may contain about 20-300 or more, of such fibers. The assembly of fibers is added to a dispersant medium to form an aqueous slurry, know in the art as "white water". The white water typically contains about 0.5% glass, dispersant(s), viscosity modifier(s), foam control and biocide additives. The fibrous slurry is then agitated to form a workable, uniform dispersion of glass fiber having a suitable consistency. The dispersant may contain polyacrylamide, hydroxyethyl cellulose, and other additive such as surfactants, lubricants, defoamers, the like, or combinations thereof.

The fiber and white water dispersion is then passed onto a mat-forming machine containing a mat forming screen. The dispersion is usually diluted with water to a lower fiber concentration prior to being dispersed on a screen. The fibers are collected at the screen in the form of a wet fiber mat, and the excess water is removed by gravity or, more preferably, by vacuum in a conventional manner, such as by vacuum boxes. Although this generally describes a wet-laid process, a dry-laid process may also be envisioned. For instance, with a dry-laid process, fibers may be spun from a bushing directly onto a moving web. The binder composition is subsequently applied.

The binder composition is traditionally applied to the gravity- or vacuum-assisted de-watered white glass mat. Application of the binder composition may be accomplished by any conventional means, such as by soaking the mat in an excess of binder solution, or by coating the mat surface by means of a binder applicator such as a sprayer or roll. The components of the binder composition may be applied separately or mixed together by any method envisioned. For instance, if applied separately, the components of the binder composition may be added by the same or a different method. The amount of binder applied to the mat also can vary considerably in the broad practice of the present invention, but loadings in the range of about 3% to about 45% by weight, such as about 10% to about 40% by weight, such as about 15% to about 25% by weight, or even about 20% to about 28% by weight of binder composition based on the dry weight of the bonded mat, will be found advantageous. For glass fibrous mats, this value can normally be confirmed by measuring the percent loss on ignition (LOI) of the glass mat product.

Following application of the binder composition, the glass fiber mat is de-watered by any reasonable means, such as under vacuum, to remove excess binder solution. The mat is then dried and the binder composition is cured in an oven at elevated temperatures, generally at a temperature of at least about 200° C., for a time sufficient to cure the organic resin. Heat treatment alone is usually sufficient to effect curing. Catalytic curing may also be used, such as a latent acid catalyst. In an embodiment, the cured glass mat generally includes about 80% by weight to about 88% by weight glass fibers, and about 12% by weight to about 20% by weight of binder, based on the total weight of the assembly of fibers and binder composition.

Further disposed on the glass mat is at least one asphaltic coating. Typically, the finished glass mat with asphaltic coating is used to prepare an asphalt roofing product, such as a roofing shingle. In the asphalt roofing product, the main role of the asphalt is to render the material impermeable to water. It also acts as support for the granules and strengthens the material, and its highly ductile nature makes it possible to obtain a flexible product which is easy to use. As a general rule, the lifetime of the asphalt roofing product increases with the amount of asphalt. The asphaltic coating typically includes byproducts derived from the oil industry, such as simple or air-blown pitches or asphalts.

The asphaltic coating can include modifying agents, for example petroleum oils, fractions or residues, polymeric materials, such as block copolymers, for example of styrene-butadiene-styrene type, mineral stabilizing agents or anti-static agents. In an embodiment, the total content of these modifying agents generally does not exceed 15% of the total weight of the asphalt composition. In an embodiment, the asphalt coating can also include up to 25% by weight, based on the total weight of the asphalt composition, of one or more amorphous polyolefins, for example, chosen from atactic polypropylenes or from copolymers of ethylene and propylene. In a particular embodiment, the amorphous polyolefins exhibit a softening temperature of between 130° C. and 160° C. The asphalt coating can also include a mineral stabilizer. Any suitable stabilizer is envisioned and includes, for example, calcium carbonate, talc, carbon black, fly ash, or a combination thereof. In an embodiment, the stabilizer is present in any suitable amount such as about 60 weight % to about 70% by weight of the asphalt composition.

The asphaltic coating may be provided by any suitable means. Methods of applying the asphalt coating includes molten laid coating, spraying, dipping, the like, or combination thereof. For instance, the glass mat with the binder composition may be coated with molten asphalt on at least one major surface. In a particular embodiment, an asphaltic coating may be on both a first major surface and a second major surface of the assembly of fibers. Typically, the asphaltic coating substantially contacts the major surface to which it is disposed on. In an embodiment, the asphaltic coating substantially impregnates a plurality of interstices between the assembly of fibers in the mat. "Substantially impregnates" as used herein refers to a depth within the glass mat of at least about 75% to about 100% of the total depth of the glass mat. In a further embodiment, the glass mat can include any suitable number of asphaltic coatings as described herein. For example, the glass mat can include more than one asphaltic coating, each of which is substantially impregnated to a suitable depth from opposite major surfaces of the assembly of fibers. Typically, the asphaltic coating is present on the glass mat as a continuous, uniform coating. In an embodiment, any asphaltic coating is envisioned and the components and amounts can vary due to product and process requirements. In a more particular embodiment, the asphaltic coating provides a mass per area of asphalt of at least about 732 g/m$^2$ as measured using the methods specified in ASTM D3462.

To form an asphalt roofing product for commercial application, further materials may be added to glass mat. In an embodiment, granules are distributed over a first asphaltic coating of the first major surface of the assembly of fibers and a release agent such as, for example, talc is applied to a second asphaltic coating of the second major surface of the assembly of fibers. The combined product may be passed between the rollers of a cooled calender, so as to partially embed the granules in the hot asphalt, and the product, once cooled, is collected in the form of a winding or of sheets cut to the desired size.

Figure 1:
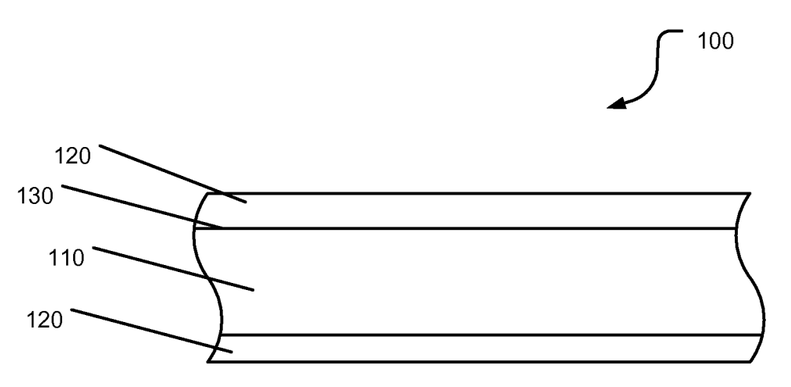
FIG. 1 includes a cross-sectional view of a portion of a glass mat illustrated in accordance with an embodiment described herein.

Turning to FIG. 1, a cross-sectional view of a portion of a glass mat 100 is illustrated in accordance with an embodiment described herein. The glass mat 100 includes an assembly of filaments 110 where the assembly of filaments 110 is fixedly bonded by a binder composition (not shown). Further included is at least one layer of an asphaltic coating 120. The at least one layer of the asphaltic coating 120 may be disposed on a first major surface 130 of the assembly of filaments 110. Any number of layers of the asphaltic coating 120 can be provided in the glass mat 100 and can be positioned directly on the assembly of filaments 110. As illustrated, the asphaltic coating 120 can be disposed on at least two surfaces of the assembly of filaments 110. Although not illustrated, any number of further layers may be included within the glass mat to further enhance any desirable properties of the final asphalt roofing product. For instance, a scrim may be included, such as disposed on the assembly of filaments 110, such as directly contacting the assembly of filaments 110. A "scrim" may also be known as a "laid-scrim" and typically describes a fabric that is non-woven with warp yarns and weft yarns.

The glass mat and asphalt roofing product as described can include suitable properties, such as tear strength, weight, and suitable loss on ignition (LOI) values. For instance, an exemplary asphalt roofing shingle of the present invention has a tear strength of at least about 1700 grams, at least about 1900 grams, such as at least about 2100 grams, or even greater as measured using the methods specified in ASTM D3462. The addition of the adhesion promoter to the glass mat provides an at least 2% increase, such as at least 5% increase, such as at least 10% increase, or even greater than a 20% increase in tear strength as measured using the methods specified in ASTM D3462, compared to an asphaltic coated glass mat having a binder composition without the adhesion promoter. Moreover, it will also be appreciated that a glass mat having the binder composition of the present invention can obtain conventional and minimum tear strength values as required by ASTM D3462 without a conventional amount of the assembly of fibers. That is, a glass mat with the binder composition of the present invention can incorporate less assemblage of fibers than a conventional glass mat and still obtain the minimum tear strength values as required by ASTM D3462.

In an embodiment, the glass mat of the present invention can have a weight of about 0.5 pound/100 square feet to about 6.0 pound/100 square feet. In a particular embodiment, the glass mat product with the binder composition as described can be effective at a lower weight, such as a weight of about 0.5 pound/100 square feet to about 4.0 pound/100 square feet, compared to a conventional glass mat product. The lower weight glass mat product can advantageously allow asphalt roofing product manufacturers to use less raw materials and achieve the same or improved performance compared to a conventional glass mat product.

In an embodiment, the glass mat can include a loss of ignition (LOI) value of not greater than about 30%, such as not greater than about 25%, or even not greater than about 20%, depending on the weight percentage of the binder composition included relative to the total weight of the glass mat.

The glass mat and the asphalt roofing product made therefrom of the present invention represents a departure from and improvement over conventional glass mat and asphalt roofing product. Without wishing to be tied to a particular theory, the glass mat with the binder composition of the present invention provides improved adhesion of the assembly of fibers as well as the asphalt coating to the assembly of fibers, resulting in a higher tear strength, in particular, for an asphaltic coated glass mat.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A glass mat including an assembly of glass fibers; a binder composition including an organic resin and an adhesion promoter including a resin acid additive, a tall oil fatty acid, a rosin, a tall oil derivative, or combination thereof; and an asphaltic coating; wherein the glass mat has an at least 2% increase in tear strength as measured using the methods specified in ASTM D3462, compared to an asphaltic coated glass mat having a binder composition without the adhesion promoter.

Item 2. An asphalt roofing product, wherein the asphalt roofing product includes a glass mat including an assembly of glass fibers; a binder composition including an organic resin and an adhesion promoter including a resin acid additive, a tall oil fatty acid, a rosin, a tall oil derivative, or combination thereof; and an asphaltic coating; wherein the glass mat has an at least 2% increase in tear strength as measured using the methods specified in ASTM D3462, compared to an asphaltic coated glass mat having a binder composition without the adhesion promoter.

Item 3. A method of increasing tear strength in an asphalt roofing product, the method including providing a glass mat for the asphalt roofing product, wherein the glass mat includes: an assembly of glass fibers; a binder composition including an organic resin and an adhesion promoter including a resin acid additive, a tall oil fatty acid, a rosin, a tall oil derivative, or combination thereof; and an asphaltic coating; wherein the glass mat has an at least 2% increase in tear strength as measured using the methods specified in ASTM D3462, compared to an asphaltic coated glass mat having a binder composition without the adhesion promoter.

Item 4. The glass mat, the asphalt roofing product, or the method of any one of Items 1-3, wherein the organic resin includes a urea-formaldehyde composition.

Item 5. The glass mat, the asphalt roofing product, or the method of Item 4, wherein the urea-formaldehyde composition includes a styrene-maleic-anhydride modified urea formaldehyde.

Item 6. The glass mat, the asphalt roofing product, or the method of any one of Items 1-5, wherein the adhesion promoter includes a tall oil fatty acid.

Item 7. The glass mat, the asphalt roofing product, or the method of any one of Items 1-6, wherein the adhesion promoter is present at an amount of up to about 10.0% by weight, based on the total weight % of the binder composition.

Item 8. The glass mat, the asphalt roofing product, or the method of Item 7, wherein the adhesion promoter is present at an amount of about 1.0% by weight to about 5.0% by weight, based on the total weight % of the binder composition.

Item 9. The glass mat, the asphalt roofing product, or the method of any one of Items 1-8, wherein the binder composition further includes an acrylic latex present at an amount of up to about 15.0% by weight, based on the total weight % of the binder composition.

Item 10. The glass mat, the asphalt roofing product, or the method of any one of Items 1-9, wherein the binder composition fixedly bonds the assembly of fibers.

Item 11. The glass mat, the asphalt roofing product, or the method of any one of Items 1-10, wherein the binder composition is about 15% by weight to about 25% by weight of the glass mat.

Item 12. The glass mat, the asphalt roofing product, or the method of any one of Items 1-11, wherein the assembly of fibers includes a non-woven mat.

Item 13. The glass mat, the asphalt roofing product, or the method of Item 12, wherein the non-woven mat includes randomly disposed fibers.

Item 14. The glass mat, the asphalt roofing product, or the method of any one of Items 1-13, wherein the assembly of fibers includes an A-type glass fiber, a C-type glass fiber, an E-type glass fiber, an S-type glass fiber, an E-CR-type glass fiber, a wool glass fiber, or a combination thereof.

Item 15. The glass mat, the asphalt roofing product, or the method of any one of Items 1-14, wherein the glass mat has a weight of about 0.5 pound/100 square feet to about 6.0 pound/100 square feet.

Item 16. The glass mat, the asphalt roofing product, or the method of any one of Items 1-15, wherein the glass mat has a weight of about 0.5 pound/100 square feet to about 4.0 pound/100 square feet.

Item 17. The glass mat, the asphalt roofing product, or the method of any one of Items 1-16, wherein the asphaltic coating includes a stabilizer.

Item 18. The glass mat, the asphalt roofing product, or the method of Item 17, wherein the stabilizer includes calcium carbonate, talc, carbon black, fly ash, or a combination thereof.

Item 19. The glass mat, the asphalt roofing product, or the method of any one of Items 1-18, wherein the asphaltic coating is positioned directly on a first major surface of the assembly of fibers.

Item 20. The glass mat, the asphalt roofing product, or the method of Item 19, wherein the asphaltic coating substantially impregnates a plurality of interstices between the assembly of fibers.

Item 21. The glass mat, the asphalt roofing product, or the method of any one of Items 1-20, wherein the asphaltic coating is positioned directly on a second major surface of the assembly of fibers.

Item 22. The glass mat, the asphalt roofing product, or the method of any one of Items 1-21, wherein the asphaltic coating is a dipped coating, a sprayed-on coating, a molten laid coating, or a combination thereof.

Item 23. The glass mat, the asphalt roofing product, or the method of any one of Items 1-22, wherein the glass mat further comprises a loss on ignition (LOI) value of not greater than about 30%.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

Two exemplary asphaltic coated glass mats are formed. Control sample is an asphaltic coated chopped fiber randomly distributed glass mat having a urea-formaldehyde binder composition. Sample 1 is similar to the Control Sample having a urea-formaldehyde binder composition with the addition of 3% tall oil fatty acid. Tear strength is measured in accordance with ASTM-D3462. The Control sample has a tear strength of 1366 grams and Sample 1 has a tear strength of 1991 grams, demonstrating the benefit of the adhesion promoter to the urea-formaldehyde binder composition. The increase in tear strength is 46%.

Example 2

Two exemplary asphaltic coated glass mats are formed. Control sample is an asphaltic coated chopped fiber randomly distributed glass mat having a standard urea-formaldehyde binder composition. Sample 2 is similar to the Control sample having a urea-formaldehyde binder composition with the addition of 3% tall oil fatty acid and a 5% self-crosslinking acrylic latex. Tear strength is measured in accordance with ASTM-D3462. The Control sample has a tear strength of 1675 grams and Sample 2 has a tear strength of 1869 grams, demonstrating the benefit of increased tear strength with the addition of the adhesion promoter to the urea-formaldehyde binder composition.

Example 3

Two exemplary asphaltic coated glass mats are formed. Control sample is an asphaltic coated chopped fiber randomly distributed glass mat having a standard urea-formaldehyde binder composition. Sample 3 is similar to the Control Sample having a urea-formaldehyde binder composition with the addition of 3% tall oil fatty acid and 6% self-crosslinking acrylic latex. Tear strength is measured in accordance with ASTM-D3462. Control sample has a tear strength of 1727 grams and Sample 3 has a tear strength of 1855 grams, demonstrating the benefit of increased tear strength with the addition of the adhesion promoter to the urea-formaldehyde binder composition.

Clearly, the data from the Examples demonstrates that the addition of the adhesion promoter, such as the tall oil fatty acid increases the tear strength compared to the Control samples without any tall oil fatty acid.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A glass mat comprising:
an assembly of glass fibers;
a binder composition comprising a urea-formaldehyde resin composition and an adhesion promoter comprising a resin acid additive, a tall oil fatty acid, a rosin, or combination thereof; and
an asphaltic coating;
wherein the glass mat has an at least 2% increase in tear strength as measured using the methods specified in ASTM D3462, compared to an asphaltic coated glass mat having a binder composition without the adhesion promoter.

2. The glass mat of claim 1, wherein the urea-formaldehyde composition includes a styrene-maleic-anhydride modified urea formaldehyde.

3. The glass mat of claim 1, wherein the adhesion promoter comprises a tall oil fatty acid.

4. The glass mat of claim 1, wherein the adhesion promoter is present at an amount of up to about 10.0% by weight, based on the total weight % of the binder composition.

5. The glass mat of claim 1, wherein the binder composition further comprises an acrylic latex present at an amount of up to about 15.0% by weight, based on the total weight % of the binder composition.

6. The glass mat of claim 1, wherein the binder composition fixedly bonds the assembly of fibers.

7. The glass mat of claim 1, wherein the binder composition is about 15% by weight to about 25% by weight of the glass mat.

8. The glass mat of claim 1, wherein the assembly of fibers includes a non-woven mat.

9. The glass mat of claim 8, wherein the non-woven mat includes randomly disposed fibers.

10. The glass mat of claim 1, wherein the assembly of fibers includes an A-type glass fiber, a C-type glass fiber, an E-type glass fiber, an S-type glass fiber, an E-CR-type glass fiber, a wool glass fiber, or a combination thereof.

11. The glass mat of claim 1, wherein the glass mat has a weight of about 0.5 pound/100 square feet to about 6.0 pound/100 square feet.

12. The glass mat of claim 1, wherein the asphaltic coating comprises a stabilizer.

13. The glass mat of claim 12, wherein the stabilizer comprises calcium carbonate, talc, carbon black, fly ash, or a combination thereof.

14. The glass mat of claim 1, wherein the asphaltic coating is positioned directly on a first major surface of the assembly of fibers.

15. The glass mat of claim 14, wherein the asphaltic coating substantially impregnates a plurality of interstices between the assembly of fibers.

16. The glass mat of claim 1, wherein the asphaltic coating is positioned directly on a second major surface of the assembly of fibers.

17. The glass mat of claim 1, wherein the glass mat further comprises a loss on ignition (LOI) value of not greater than about 30%.

18. An asphalt roofing product, wherein the asphalt roofing product comprises
- a glass mat comprising an assembly of glass fibers;
- a binder composition comprising a urea-formaldehyde resin composition and an adhesion promoter comprising a resin acid additive, a tall oil fatty acid, a rosin, or combination thereof; and
- an asphaltic coating;
- wherein the glass mat has an at least 2% increase in tear strength as measured using the methods specified in ASTM D3462, compared to an asphaltic coated glass mat having a binder composition without the adhesion promoter.

19. A method of increasing tear strength in an asphalt roofing product, the method comprising providing a glass mat for the asphalt roofing product, wherein the glass mat comprises:
- an assembly of glass fibers;
- a binder composition comprising a urea-formaldehyde resin composition and an adhesion promoter comprising a resin acid additive, a tall oil fatty acid, a rosin, or combination thereof; and
- an asphaltic coating;
- wherein the glass mat has an at least 2% increase in tear strength as measured using the methods specified in ASTM D3462, compared to an asphaltic coated glass mat having a binder composition without the adhesion promoter.

* * * * *